United States Patent [19]
Yoshida

[11] Patent Number: 5,764,881
[45] Date of Patent: Jun. 9, 1998

[54] READ/WRITE APPARATUS AND ALTERNATION PROCESS METHOD

[75] Inventor: Osamu Yoshida, Higashine, Japan

[73] Assignee: Fujitsu Limited, Kawasaki, Japan

[21] Appl. No.: 564,880

[22] Filed: Nov. 30, 1995

[30] Foreign Application Priority Data

Mar. 20, 1995 [JP] Japan .................. 7-061323

[51] Int. Cl.⁶ .................................................. G06F 11/00
[52] U.S. Cl. ........................................................ 395/182.06
[58] Field of Search ........................ 395/182.06, 182.01, 395/182.05, 183.8, 183.05, 184.01, 185.01, 185.02, 185.06, 185.07

[56] References Cited

U.S. PATENT DOCUMENTS

| | | | |
|---|---|---|---|
| 3,771,143 | 11/1973 | Taylor | 340/172.5 |
| 4,066,880 | 1/1978 | Salley | 235/302.3 |
| 4,355,376 | 10/1982 | Gould | 365/200 |
| 4,945,535 | 7/1990 | Hosotani et al. | 371/11.1 |
| 5,146,571 | 9/1992 | Logan | 395/400 |
| 5,166,936 | 11/1992 | Ewert et al. | 371/21.6 |
| 5,189,566 | 2/1993 | Christensen et al. | 360/53 |
| 5,313,626 | 5/1994 | Jones | 395/575 |
| 5,418,752 | 5/1995 | Harari et al. | 365/218 |
| 5,450,609 | 9/1995 | Schultz et al. | 395/800 |
| 5,479,611 | 12/1995 | Oyama | 395/185.01 |
| 5,506,977 | 4/1996 | Jones | 395/482 |
| 5,564,011 | 10/1996 | Yammina et al. | 395/182.13 |
| 5,577,194 | 11/1996 | Wells et al. | 395/182.06 |

FOREIGN PATENT DOCUMENTS

| | | |
|---|---|---|
| 155467 | 6/1988 | Japan . |
| 528651 | 2/1993 | Japan . |

*Primary Examiner*—Phung Chung
*Assistant Examiner*—Norman M. Wright
*Attorney, Agent, or Firm*—Greer, Burns & Crain,Ltd.

[57] ABSTRACT

In a read operation in a read/write apparatus, an error process determination part determines whether or not an alternation process should be performed in a sector in which a read error has occurred. When it is determined that an alternation process should be performed, an address of a sector that is a target of the alternation process is stored in an automatic alternation address storage part. In a write operation, an automatic alternation process determination part determines whether or not a sector that is a target of the write operation has its address stored in the automatic alternation address storage part. When it is determined that the target address is stored, an automatic alternation process part performs an alternation process so as to allow a write process to be performed in an alternative area.

8 Claims, 10 Drawing Sheets

READ/WRITE APPARATUS AND ALTERNATION PROCESS METHOD

BACKGROUND OF THE INVENTION

1. Field of the Invention

The present invention generally relates to read/write apparatuses and alternation process methods, and more particularly to a read/write apparatus and an alternation process method, having increased likelihood of recovering defective sectors so that the reliability of the read/write apparatus is improved.

In a read/write apparatus, it should be ensured that data written in a recording medium be read properly. In recent apparatuses, this is accomplished by writing data to and reading the same from an alternative sector that is disposed as a substitute for a defective sector in the recording medium. The defective sector may be caused by a defect occurring during the production of the recording medium, a deterioration in a characteristic of the medium, a gathering of fine particles on the medium, or damage or the like to the surface of the medium. However, it is to be noted that some sectors can be restored to normal. In view of a demand for an increased storage capacity, it is required that room be reserved for restoration of as many sectors as possible.

2. Description of the Prior Art

Conventionally, various alternation processes for dealing with a defective sector in a recording medium are known. For example, as disclosed in Japanese Laid-Open Patent Application No. 5-28651 that relates to an alternation process, the distance between one defective sector from among a plurality of sectors to a next defective sector is calculated and stored in a memory, whereupon a reading operation is performed by referring to the information thus stored. According to another scheme, alternative sectors are provided in a predetermined area of the recording medium. Further, Japanese Laid-Open Patent Application No. 63-155467 discloses a scheme whereby a memory called an alternative area memory which allows reading therefrom and writing thereto is provided to serve as alternative sectors.

Some alternation processes are performed in response to an instruction from a host apparatus, and others are automatically performed by a read/write apparatus.

Figure 1:
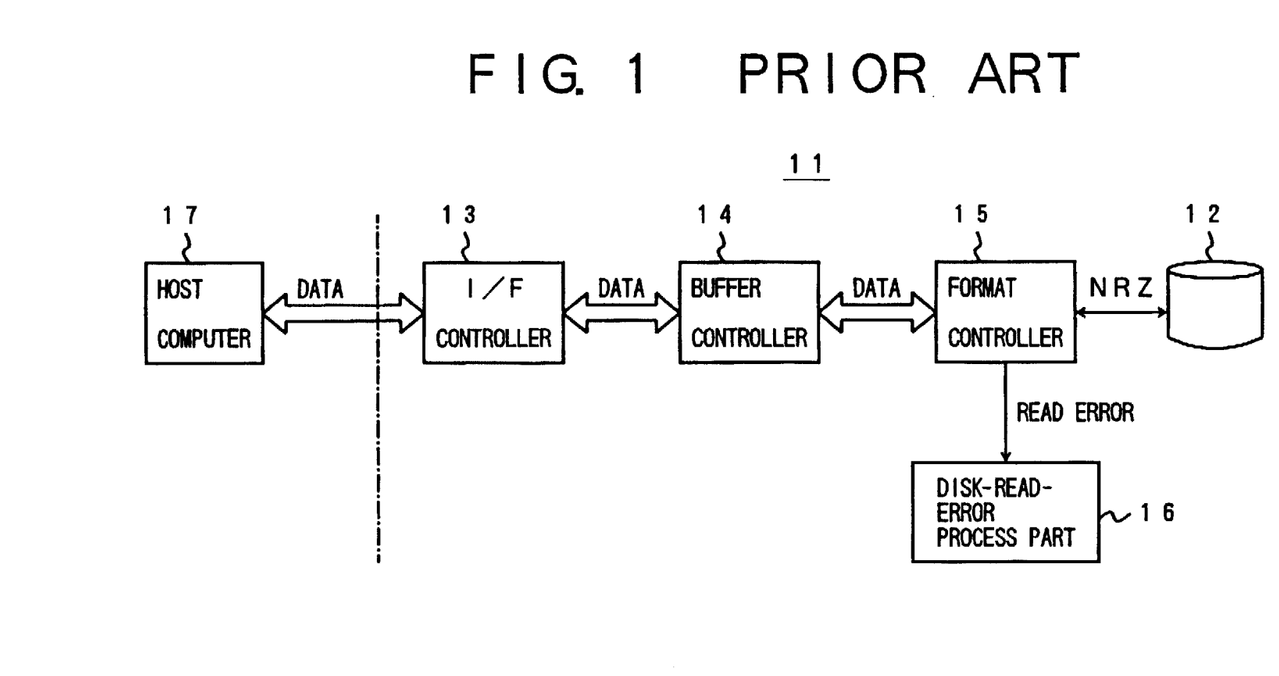
FIG. 1 is a function block diagram of a conventional read/write process where an automatic alternation process is not performed.

FIG. 1 is a functional block diagram of a conventional read/write process where an automatic alternation process is not performed. The functional block diagram of FIG. 1 is applicable to a disk drive 11, an example of a read/write apparatus. For read/write operations with respect to a disk 12 (recording medium), the disk drive 11 has an I/F (interface) controller 13, a buffer controller 14, a format controller 15 and a disk-read-error process part 16. The disk drive 11 is connected to a host computer 17 (host apparatus). Commands and data from the host computer 17 are fed to the I/F controller 13 via an interface circuit (not shown). The I/F controller 13 outputs data and a predetermined notification to the host computer 17.

The buffer controller 14 controls a buffer for temporarily storing data that the disk drive 11 reads from or writes to the disk 12. The format controller 15 adds error correction codes (ECCs) to the data written to the disk 12 before a writing operation and performs a process for determining whether or not a read error has occurred in reading data from the disk 12. The disk-read-error process part 16 supplies a notification to the host computer 17 when the format controller 15 outputs a read error signal. NRZ indicated in FIG. 1 denotes a method whereby recording is performed such that the signal level representing each bit maintains the assigned value for the entire time duration allotted to the bit, that is, does not return to zero.

Figure 2:
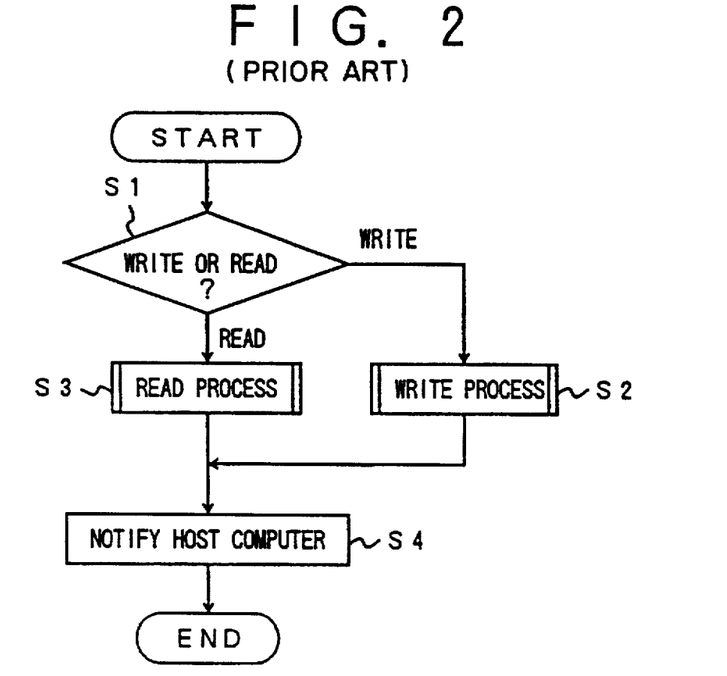
FIG. 2 is a flowchart of the process of FIG. 1.

FIG. 2 is a flowchart of the process of FIG. 1. Referring to FIG. 2, a determination is made in the disk drive 11 as to whether a command from the host computer 17 is a write command or a read command (step S1). When the command is a write command, a write process is performed (S2). When the command is a read command, a read process is performed (S3). When the write process is completed, a notification indicating so is transferred to the host computer 17; when the read process is completed, a notification indicating so and data that is read are transferred to the host computer 17 (S4).

In a read process, the error process part 16 is notified of a detection of a read error by the format controller 15, whereupon the error process part 16 notifies the host computer 17 of the fact that there is a read error. In response to this notification, the host computer 17 instructs the disk drive 11 to perform an alternation process, re-try reading from a sector in which the read error has occurred or perform a different process. In this configuration, the alternation process is not performed automatically by the disk drive 11. The disk drive 11 supplies a notification to the host computer 17 and turns the control over thereto.

Figure 3:
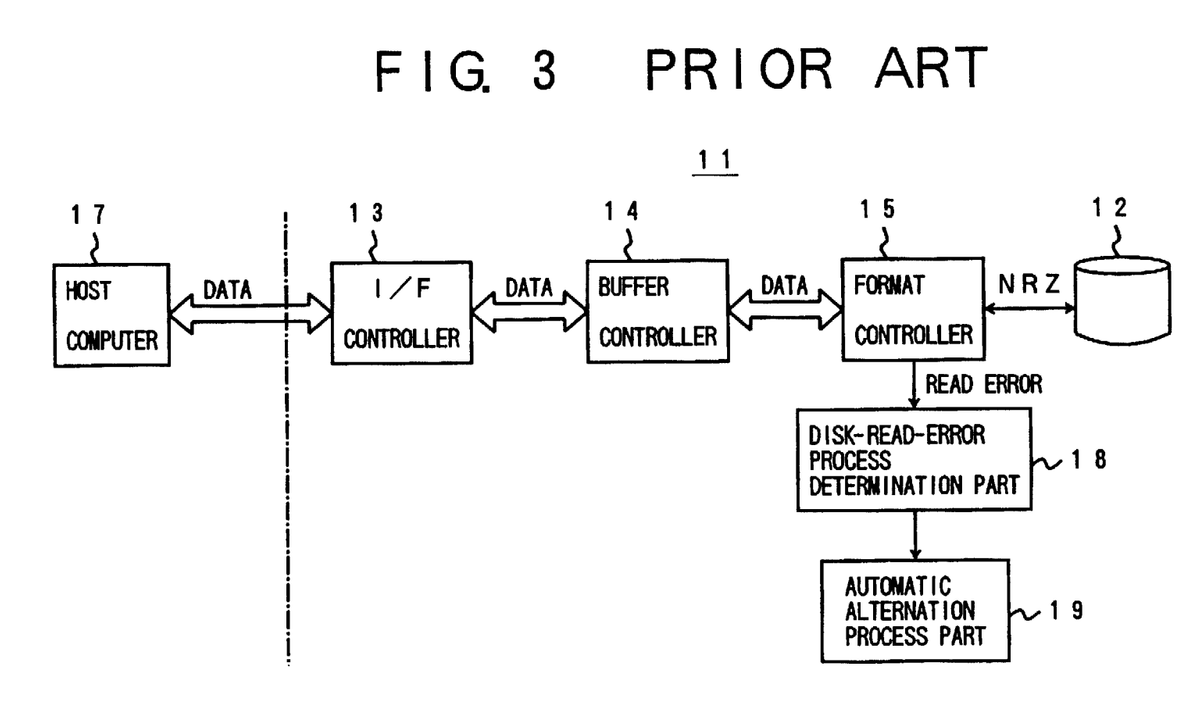
FIG. 3 is a functional block diagram of a conventional read/write process where an automatic alternation process is performed.

FIG. 3 is a functional block diagram of a conventional read/write process where an automatic alternation process is performed. Those components that are the same as the components of FIG. 1 are designated by the same reference numerals and the description thereof is omitted. The disk drive 11 shown in FIG. 3 is the same as the disk drive 11 of FIG. 1 except that the disk-read-error process part 16 is replaced by a disk-read-error process determination part 18 and an automatic alternation process part 19.

The disk-read-error process determination part 18 is supplied with a signal indicating a read error from the format controller 15 and determines whether or not the alternation process is to be carried out in a sector where the read error has occurred. When the disk-read-error process determination part 18 determines that the alternation process is to be carried out, the automatic alternation process part 19 allocates a defective sector to a predetermined alternative area and notifies the host computer 17 accordingly.

Figure 4:
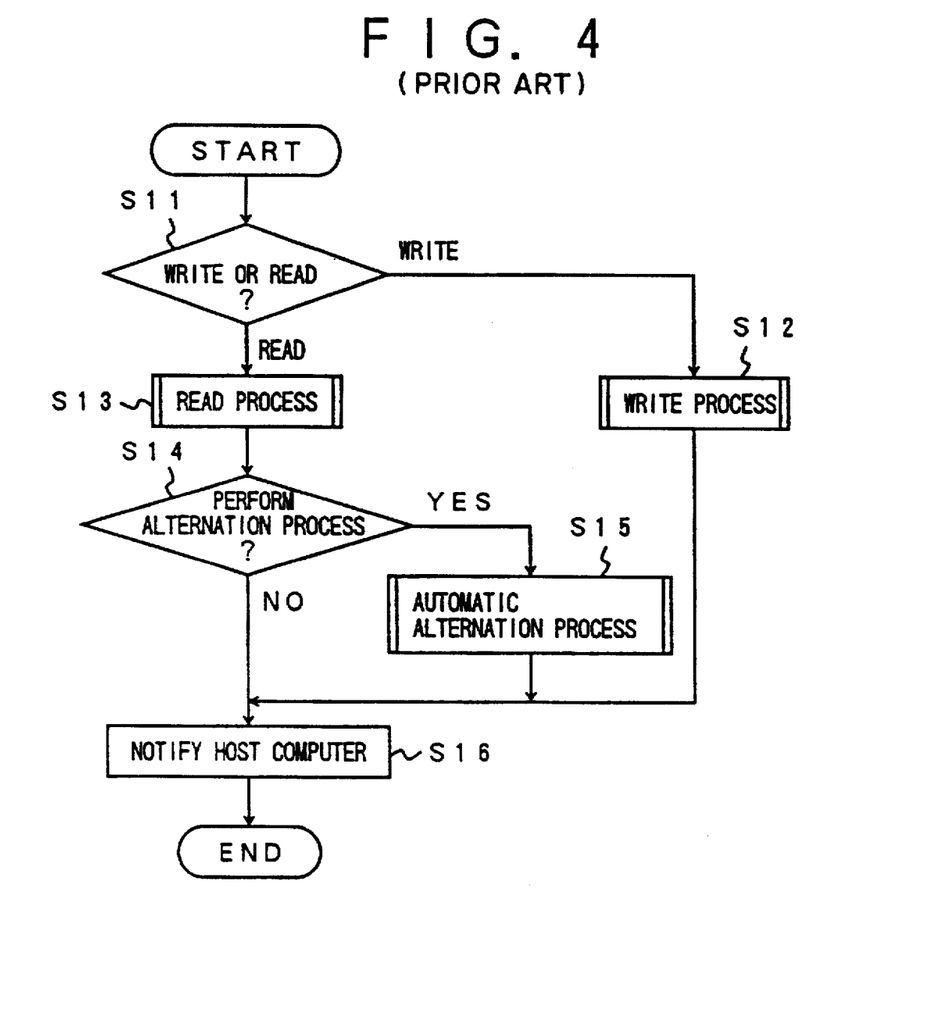
FIG. 4 is a flowchart of the process of FIG. 3.

FIG. 4 is a flowchart of the process of FIG. 3. Referring to FIG. 4, a determination is made as to whether the host computer 17 has issued a write command or a read command (S11). If the command is a write command, a write process is performed (S12). If the command is a read command, a read process is performed (S13). When a read error is generated in the read process, a determination is made as to whether or not the alternation process is to be performed in the disk drive 11, that is, whether or not the automatic alternation process is to be performed (S14). Specifically, the disk-read-error process determination part 18 determines that the alternation process is to be carried out when it is not possible for the format controller 15 to recover data by retrying or by using error correction codes (S15). When the write process in S12 is completed, when the alternation process is not carried out, or when the automatic alternation process is completed, the host computer 17 is notified accordingly (S16).

The methods of FIGS. 3 and 4 may be employed as an option in the SCSI(small computer system interface)-2 interface. In this option, a sector where the disk drive 11 fails to read data properly is allocated to an alternative area in an automatic alternation process.

However, the conventional technology described above has problems. In case the host computer 17 performs the alternation process as shown in FIG. 1, the host computer 17 may be provided with a procedure relating to the alternation process. However, the procedure varies from drive to drive because it depends on the function and structure of the disk drive 11. That is, the procedure lacks connectability and compatibility. An additional problem is that the procedure is relatively complex and cannot be supported by small computers that are generally used.

In the case where the host computer 17 performs the alternation process or the disk drive 11 performs the automatic alternation process as shown in FIG. 3, there is a problem in that once the alteration process is carried out the defective sector can no longer be accessed, with the result that the data in the defective sector cannot be recovered any more.

SUMMARY OF THE INVENTION

Accordingly, an object of the present invention is to provide a read/write apparatus and an alternation process method in which apparatus and method the aforementioned problems are eliminated.

Another and more specific object of the present invention is to provide a read/write apparatus and an alternation process method in which apparatus and method the likelihood of recovering data from defective sectors being recovered are increased so that the reliability is improved.

In order to achieve the aforementioned objectives, the present invention provides a read/write apparatus comprising: alternation process means performing an alternation process whereby a defective sector found in a read/write operation on a recording medium is allocated to a predetermined alternative area; storage means storing an address of a sector on the recording medium in which sector a read error has occurred in a reading operation; error process determination means determining whether or not an address of a sector in which a read error has occurred is to be stored in the storage means; and alternation process determination means determining whether or not a sector that is a target of a write operation has its address stored in the storage means, and causing, when an affirmative result is yielded in the determination, the write operation to be performed in an alternative area prepared by the alternation process means.

The present invention also provides an alternation process method for a read/write apparatus wherein a defective sector found in a read/write operation on a recording medium is allocated to a predetermined alternative area, the alternation process method comprising the steps of: a) determining whether or not an alternation process should be carried out in a sector on the recording medium in which sector a read error has occurred in a read operation; b) storing an address of a sector that is a target of an alternation process in storage means, when a determination is given that the alternation process should be carried out; c) determining whether or not a sector in which a write operation is carried out has its address stored in the storage means; d) allocating the sector in which the write operation is carried out to the alternative area, when it is determined in step c) that the sector has its address stored in the storage means; and e) performing a write process in the alternative area subjected to an alternation process of step d).

In accordance with the present invention, no alternation process is performed in a sector in which a read error has occurred until a write operation is performed in that sector. In this way, it is possible to increase possibilities of data written in the sector being recovered and improve the reliability of the apparatus.

In further accordance with the present invention, not only a sector in which data cannot be recovered but also a sector in which data is recovered by a predetermined data correction operation or a retry operation is subjected to an alternation process. In this way, it is possible to subject sectors in which a read error could potentially occur to an alternation process, thus improving the reliability of the apparatus.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 5:
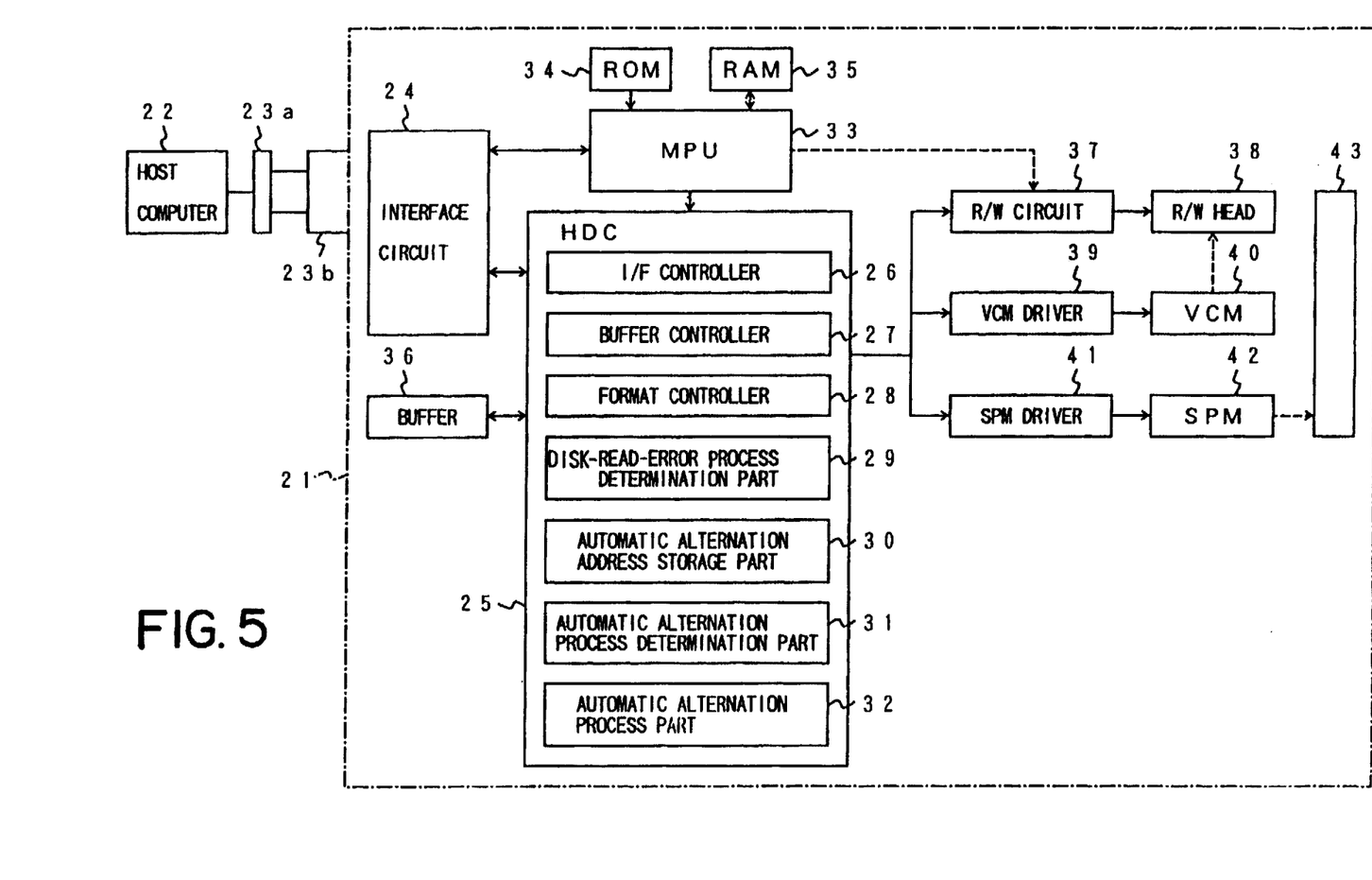
FIG. 5 is a block diagram of an embodiment of the present invention.

FIG. 5 is a block diagram of an embodiment of the present invention. Specifically, FIG. 5 is a block diagram showing the construction of a magnetic disk drive 21 as an example of a read/write apparatus. The magnetic disk drive 21 is connected to a host computer 22 (host apparatus) via interface devices (SCSI devices) 23a and 23b.

An interface circuit 24 of the magnetic disk drive 21 is connected to a hard disk controller (HDC) 25. User data and the like is fed from the host computer 22 to the HDC 25 via the interface circuit 24.

The HDC 25 is at least equipped with an I/F controller 26, a buffer controller 27, a format controller 28, a disk-read-error process determination part 29 (disk-read-error process determination means), an automatic alternation address storage part 30 (storage means), an automatic alternation process determination part 31 (alternation process determination means) and an automatic alternation process part 32 (alternation process means).

The interface circuit 24 is connected to an MPU 33. The MPU 33 is provided with a read-only memory (ROM) 34 and a random access memory (RAM) 35. Various commands including a read command and a write command are fed from the host computer 22 to the MPU 33 via the interface circuit 24.

The HDC 25 is provided with a buffer 36 for temporarily storing user data fed to the HDC 25. The data stored in the buffer 36 is output in a write operation so as to be fed to a R/W (read/write) head 38 via a R/W circuit 37. The R/W circuit 37 is equipped with a demodulating circuit, a modulating circuit, an A/D conversion circuit, a D/A conversion circuit. The circuits provided in the R/W circuit 37 are not shown in FIG. 5. A write gate signal and a read gate signal are supplied from the MPU 33 to the R/W circuit 37.

The HDC 25 drives a voice coil motor (VCM) 40 via a voice coil motor driver (VCM driver) 39. In a seek operation, the VCM 40 drives the R/W head 38 in a radial direction of a magnetic disk 43.

Further, the HDC 25 drives a spindle motor (SPM) 42 via a spindle motor driver (SPM driver) 41. The SPM 42 rotates the magnetic disk 43 (recording medium) at a constant speed.

Commands and data are fed from the host computer 22 to the I/F controller 26 of the HDC 25 via the interface circuit 24. Data and a predetermined notification are fed from the I/F controller 26 to the host computer 22. The buffer controller 27 controls the buffer 36 for temporarily storing data written to and read from the magnetic disk 43. The format controller 28 adds ECCs to the data written to the magnetic disk 43 before a writing operation. The format controller 28 also makes a determination as to whether or not a read error has occurred in a reading operation.

When a read error occurs when data is read from a sector in the magnetic disk 43, the disk-read-error process determination part 29 determines whether or not the address of that sector is to be stored in the automatic alternation address storage part 30. Each time the disk-read-error process determination part 29 determines that an alternation process should be carried out, the automatic alternation address storage part 30 stores the address of a target defective sector.

In a predetermined write operation with respect to the magnetic disk 43, the automatic alternation process determination part 31 determines whether or not the target sector in the writing operation has the address stored in the automatic alternation address storage part 30. If this determination yields an affirmative answer, the automatic alternation process determination part 31 outputs a signal to the automatic alternation process part 32, indicating that an alternation process should be carried out. The automatic alternation process part 32 substitutes an alternative area (for example, an alternative sector on the magnetic disk 43, or a predetermined RAM) for the defective sector. The subsequent access is conducted with respect to the alternative area.

Figure 6A:
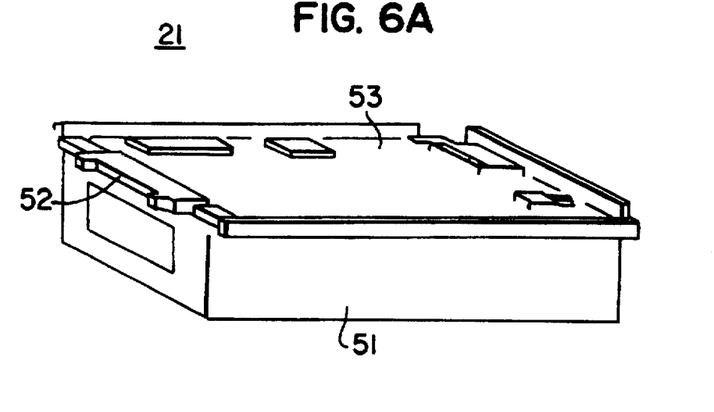
FIG. 6A is a schematic overview of a disk drive of FIG. 5.
Figure 6B:
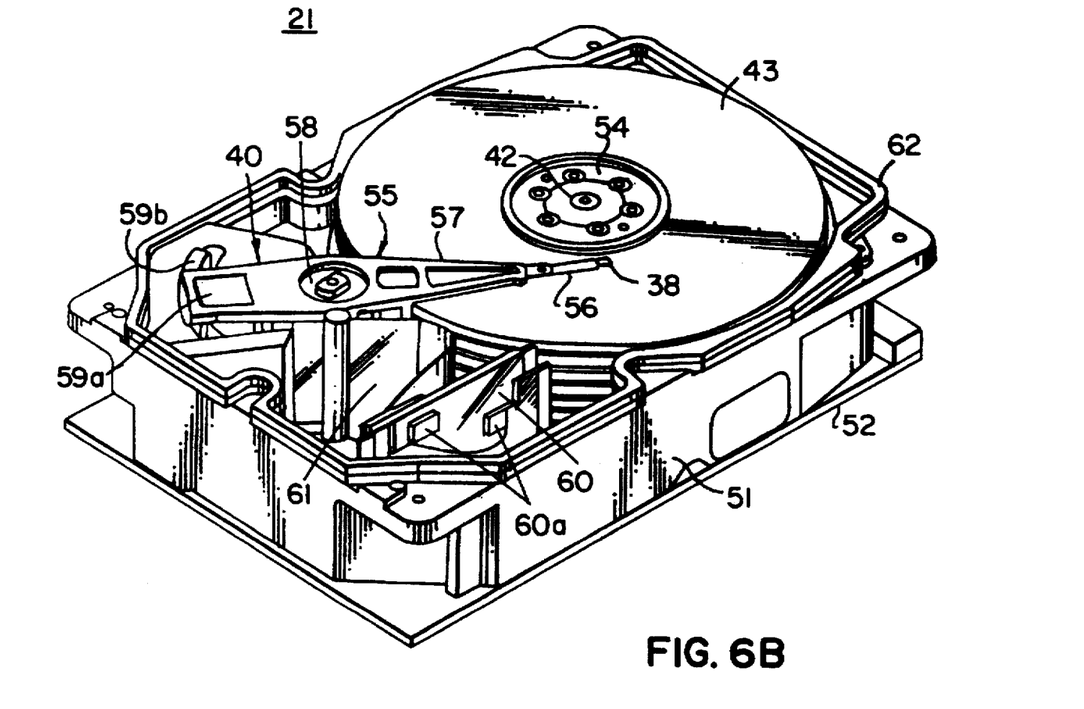
FIG. 6B is a perspective view of the interior of the disk drive of FIG. 5.

FIGS. 6A and 6B show the construction of the magnetic disk drive of FIG. 5. FIG. 6A is a schematic view of the disk drive, and FIG. 6B is a perspective view of the interior of the disk drive. More specifically, FIG. 6A is a bottom view of the magnetic disk drive 21 in which a printed-circuit board 53 is disposed on a base 52 that serves as a base for an enclosure 51. Circuit elements such as LSIs, including controller elements of FIG. 5 (HDC 25, MPU 33 and the like), are mounted on the printed-circuit board 53.

Referring to FIG. 6B, the magnetic disk 43 is rotatably fitted to the spindle motor (SPM) 42 having a spindle mechanism 54 accommodated in the enclosure 51 on the base 52.

An actuator 55 is configured such that a predetermined number of arms 57 each of which is fitted at one end with a support spring mechanism 56 having the R/W head 38 mounted thereon are secured to a rotation shaft 58. A voice coil motor (VCM) 40 (driving means) consisting of a voice coil 59a and a magnet 59b is disposed at the other end of the arm 57 so as to be opposite to the R/W head 38 across an intervening part that includes the rotation shaft 58.

A printed-circuit board 60 on which a head IC 60a and the like are mounted is connected to the printed-circuit board 53 via a flexible printed-circuit board (FPC) 61. A cover (not shown) is fitted to the enclosure 51 via a sealing member 62.

Figure 7:
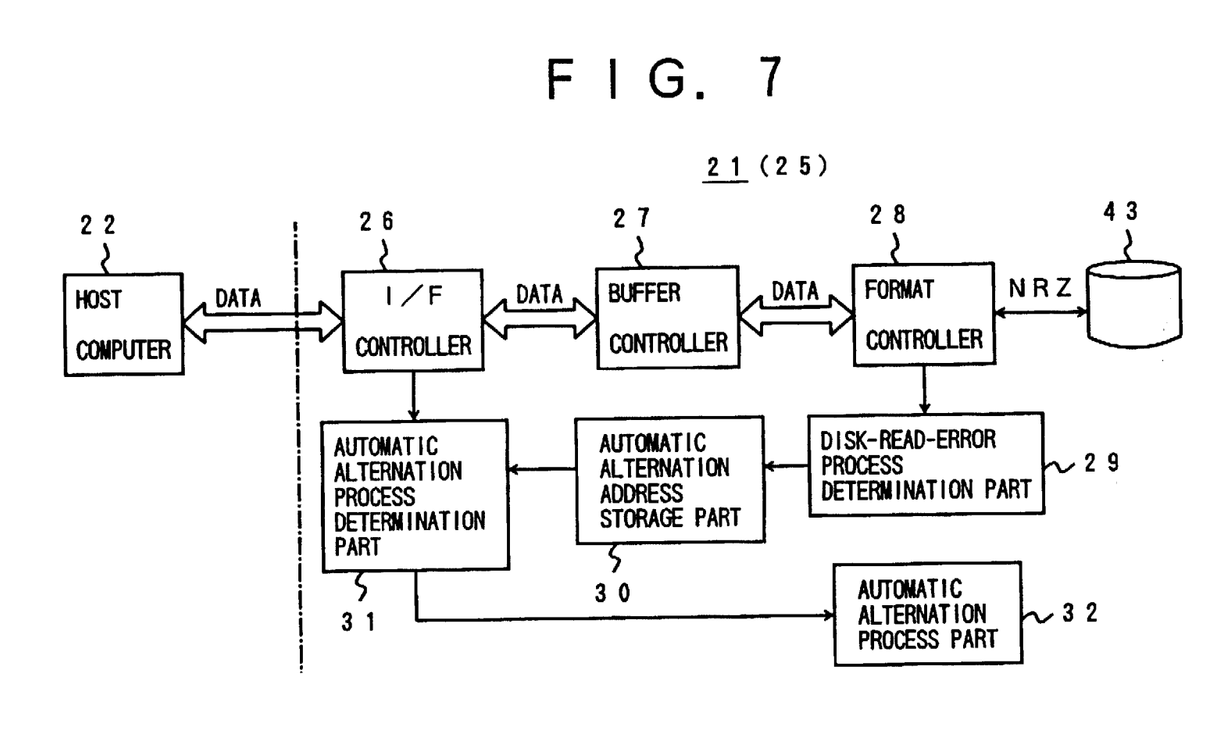
FIG. 7 is a functional block diagram of the present invention.

FIG. 7 is a functional block diagram of the present invention. Referring to FIG. 7, the host computer 22 issues a read request or a write request to the MPU 33 of FIG. 5. In a case of a read request, data written in a target sector of the magnetic disk 43 is read under the control of the format controller 28, and the read data is temporarily stored in the buffer 36 controlled by the buffer controller 37. The read data is transferred to the host computer 22 under the control of the I/F controller 26.

In a case of a write request, data to be written is temporarily stored in the buffer 36 via the I/F controller 26 under the control of the buffer controller 27. The data is written to a target sector of the magnetic disk 43 under the control of the format controller 28. Normal reading and writing operations are conducted in the manner described above.

When a read error is detected by the format controller 28 in a reading operation, the format controller 28 performs a predetermined number of retry operations and/or a data correction operation using ECCs. The format controller 28 transfers, to the disk-read-error process determination part 29, the address of the sector in which the read error has occurred, and a result of a determination as to whether or not the retry operations and/or the data correction operation has succeeded in recovering the data in the target sector. The disk-read-error process determination part 29 makes a determination on the basis of the data from the format controller 28 as to whether or not the automatic alternation process is to be carried out. The disk-read-error process determination part 29 stores the address of the sector subjected to the automatic alternation process in the automatic alternation address storage part 30.

In a write operation, the address of a sector that is a target of the write operation is transferred from the host computer 22 to the automatic alternation process determination part 31 via the I/F controller 26. The automatic alternation process determination part 31 determines whether or not the address of the sector that is a target of the write operation agrees with the address stored in the automatic alternation address storage part 30. If the addresses are in agreement, the automatic alternation process determination part 31 outputs a signal to the automatic alternation process part 32, indicating that the alternation process should be carried out.

Figure 8:
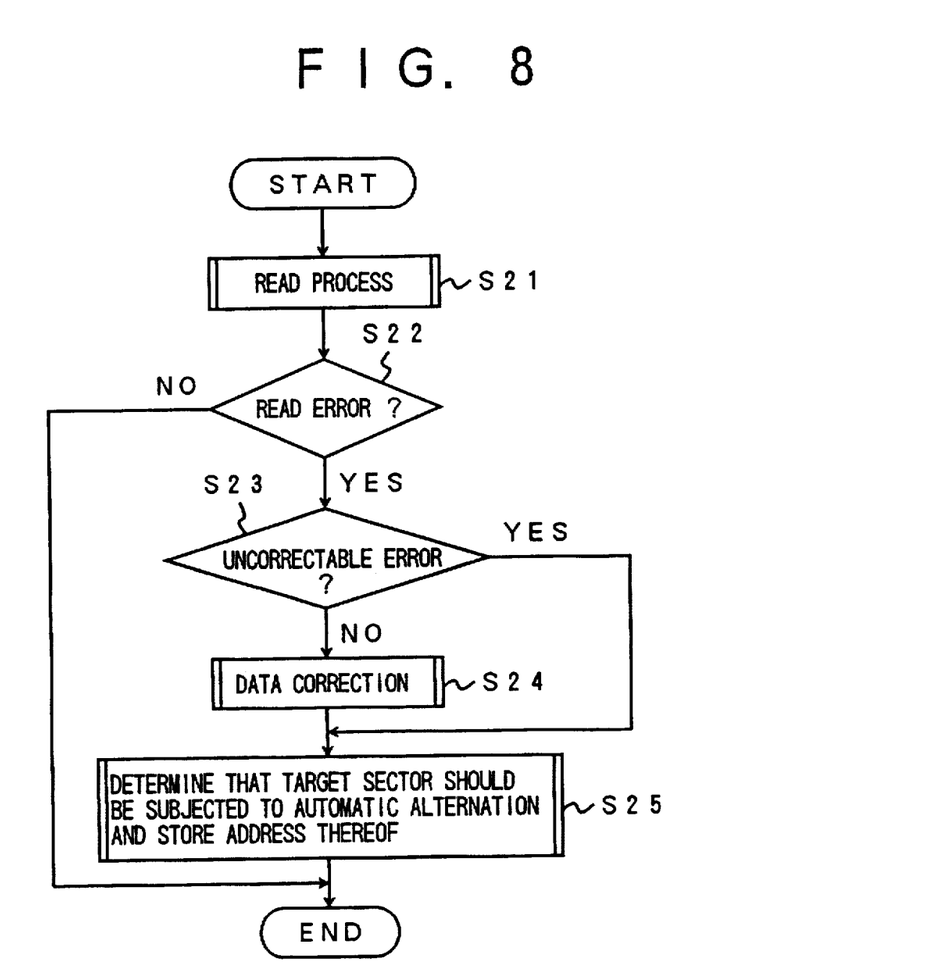
FIG. 8 is a flowchart (1) of a process for determining a target of an automatic alternation process.
Figure 9:
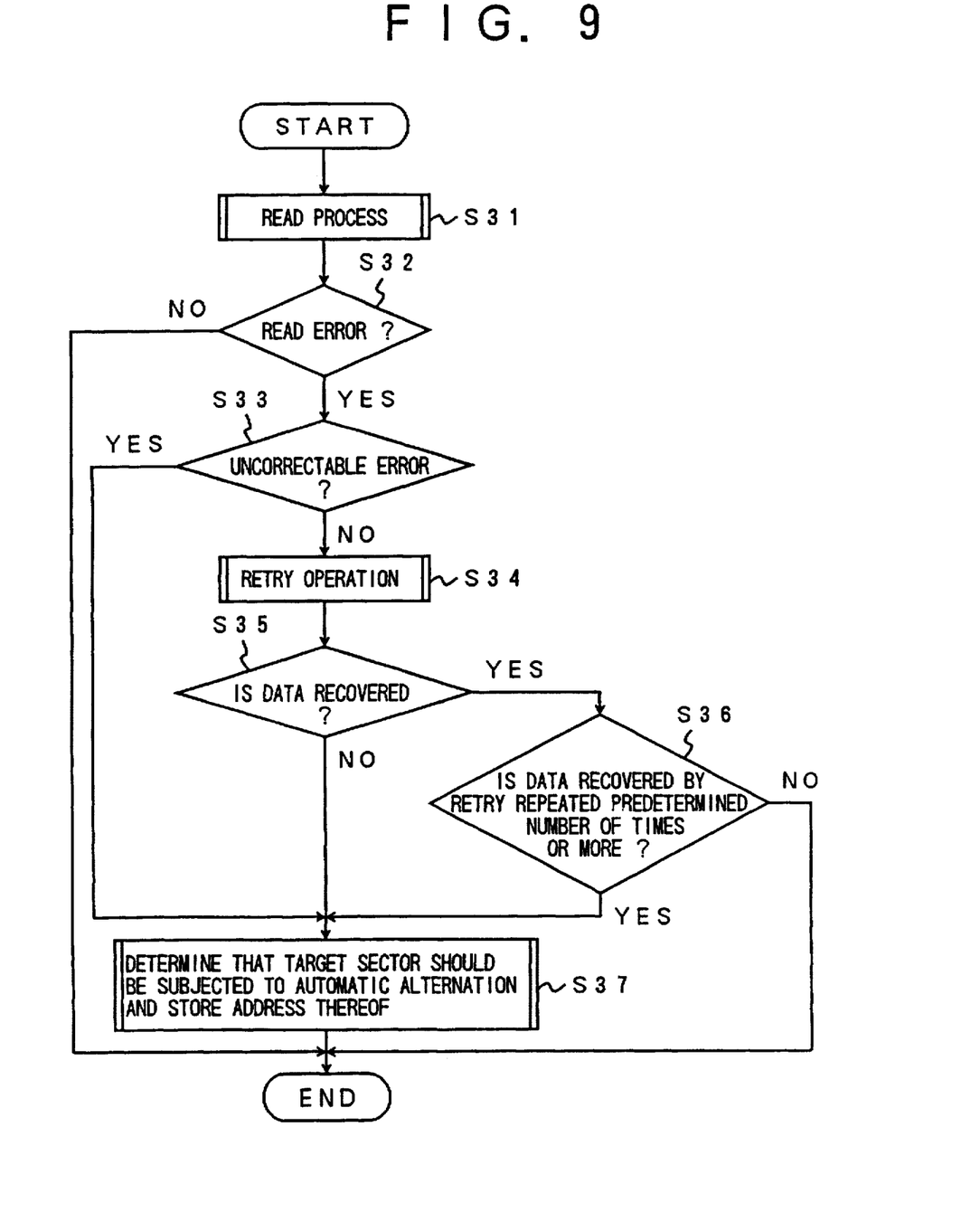
FIG. 9 is a flowchart (2) of a process for determining a target of an automatic alternation process.

FIGS. 8 and 9 are flowcharts of a process for determining a target of the automatic alternation process. Referring to FIG. 8, a read process is performed in response to a read request (S21) and a determination is made as to whether or not there is a read error (S22). If no read error is detected, the address is not stored and the read operation is terminated.

When a read error is detected, a determination is made as to whether or not the read error is a uncorrectable error (S23). If the read error is not an uncorrectable error, a data correction is performed using ECCs so as to recover the data (S24). The address of the sector from which the data is recovered or the address of the sector in which it is determined in S23 that the uncorrectable error has occurred is determined by the disk-readerror process determination part 29 to be the target of the automatic alternation process and stored in the automatic alternation address storage part 30

(S25). By subjecting the address of the sector from which the data is recovered to the automatic alternation process, sectors in which a read error could potentially occur are removed so that the reliability is improved.

Referring to FIG. 9, a read process is performed in response to a read request (S31) and a determination is made as to whether or not there is a read error (S32). When no read error is detected, the address is not stored and the read operation is terminated. If a read error is detected, a determination is made as to whether or not the read error is an uncorrectable error (S33). If the read error is not an uncorrectable error, the retry operation is repeated a predetermined number of times (S34). A determination is then made as to whether or not data is recovered by the retry operations (S35). If the data is recovered, a determination is made as to whether or not the data is recovered by the retry operation repeated a predetermined number of times or more (S36). If the data is recovered by the retry operation repeated fewer than a predetermined number of times, the relevant sector is considered to be restored to normal. The operation is then terminated without the address being stored.

If a determination of an uncorrectable error is given in S33, or if it is found in S35 that the data is not recovered by the retry operations, or if it is found in S36 that the data is recovered by the retry operation repeated a predetermined number of times or more, the disk-read-error process determination part 29 determines that the target sector is to be subjected to the automatic alternation process. The address of the target sector is stored in the automatic alternation address storage part 30 and the operation is terminated (S37).

By subjecting the address of the sector from which the data is recovered by the retry operation repeated a predetermined number of times or more to the automatic alternation process, sectors in which a read error could potentially occur are removed so that the reliability is improved.

To summarize, as shown in FIGS. 8 and 9, a sector in which an uncorrectable error has occurred, a sector in which data is corrected or a sector from which data is recovered by the retry operation repeated a predetermined number of times or more is determined to be the target of the automatic alternation process and the address thereof is stored in the automatic alternation address storage part 30.

Figure 10:
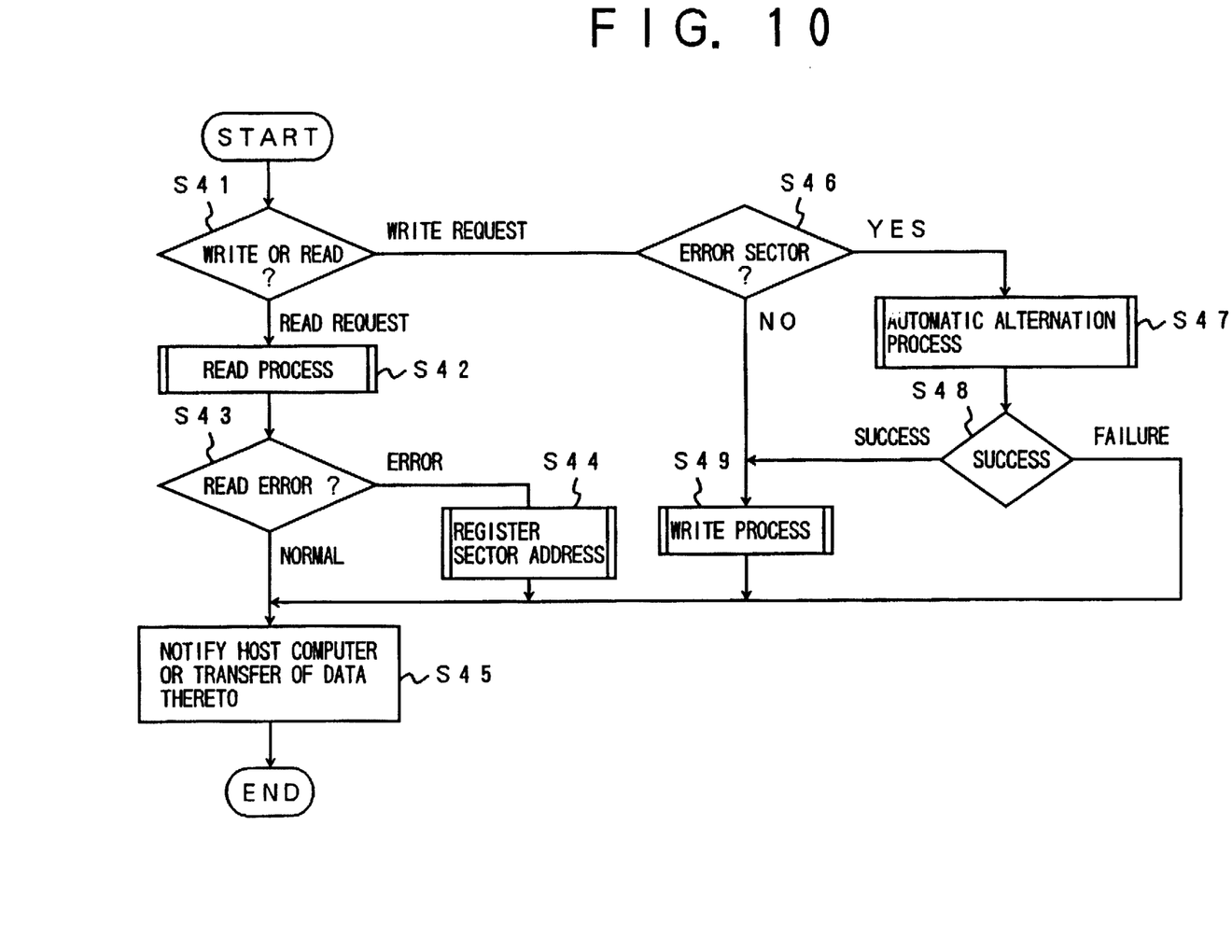
FIG. 10 is a flowchart of an alternation process according to the present invention.

FIG. 10 is a flowchart of the automatic alternation process of the present invention. Referring to FIG. 10, a determination is made as to whether a command issued by the host computer 22 is a read request (command) or a write request (command) (S41). If the issued command is a read request, the read process is performed (S42). In the read operation, a determination is made as to whether or not there is a read error (S43). In case of a read error, a sector in which an uncorrectable error has occurred, a sector in which data is recovered by a data correction operation or a sector from which data is recovered by the retry operation repeated a predetermined number of times or more is determined to be the target of the automatic alternation process and the address thereof is stored in the automatic alternation address storage part 30, as shown in FIGS. 8 and 9 (S44). The host computer 22 is then notified of an end of the storing operation (S45). If no read error is detected, the read data is transferred to the host computer 22 (S45).

If the command from the host computer 22 is a write request (S41), a determination is made as to whether or not the address of a sector that is a target of the write operation is stored in the automatic alternation address storage part 30 (S46). If the target address is stored, the automatic alternation process part 32 performs an automatic alternation process so as to allocate the target sector to an alternative sector (S47). If the automatic alternation process fails (S48), the host computer 22 is notified accordingly (S45). If the automatic alternation process is carried out successfully, the address of the target sector is removed from the automatic alternation address storage part 30.

If the address of the target sector is not stored in the automatic alternation address storage part 30 (S46), the write process is conducted with respect to the target sector (S49). If the automatic alternation process (S47) succeeds, the write process is conducted with respect to the alternative sector (S49). In either case, the host computer 22 is notified accordingly (S45).

If the host computer 22 requests a writing of data in the sector that is a target of the automatic alternation process, it does not create any problem with the automatic alternation process carried out in the writing operation, because it means that the host computer 22 does not require the data in that sector.

As described above, by carrying out the automatic alternation process in the writing operation, possibilities of the data in the defective sector being recovered can be increased. Since the sector in which the read operation fails remains intact, there is room for a system user to use an application to perform a desired process. That is, the reliability of the system can be improved by reserving as much as room as possible for the user data to be recovered when the read operation fails.

The present invention is not limited to the above-described embodiments, and variations and modifications may be made without departing from the scope of the present invention.

What is claimed is:

1. A read/write apparatus comprising:

alternation process means for performing an alternation process whereby a defective sector found in a read/write operation on a recording medium is allocated to a predetermined alternative area;

storage means storing an address of a sector on said recording medium in which sector a read error has occurred in a reading operation;

error process determination means for determining whether or not an address of a sector in which a read error has occurred is to be stored in said storage means wherein said error process determination means operates independently of a configuration of said storage means with a host apparatus; and alternation process determination means for determining whether or not a sector that is a target of a write operation has its address stored in said storage means, and causing, when an affirmative result is yielded in the determination, the write operation to be performed in an alternative area prepared by said alternation process means.

2. The read/write apparatus as claimed in claim 1, wherein said error process determination means makes a determination whereby an address of a sector in which a read error has occurred and from which data cannot be recovered is stored in said storage means.

3. The read/write apparatus as claimed in claim 2, wherein said error process determination means makes a determination whereby an address of a sector in which data is recovered by a predetermined data correction process, as well as an address of said sector in which a read error has occurred and from which data cannot be recovered are stored in said storage means.

4. The read/write apparatus as claimed in claim 2, wherein said error process determination means makes a determination whereby an address of a sector in which data is recovered by a retry operation repeated a predetermined number of times after a read error, as well as an address of said sector in which a read error has occurred and from which data cannot be recovered are stored in said storage means.

5. An alternation process method for a read/write apparatus wherein a defective sector found in a read/write operation on a recording medium is allocated to a predetermined alternative area, said alternation process method comprising the steps of:

a) determining whether or not an alternation process should be carried out in a sector on said recording medium in which sector a read error has occurred in a read operation, even if the data in said sector is recoverable, wherein said alternation process operates independently of a configuration of a read/write apparatus with a host apparatus;

b) storing an address of a sector that is a target of an alternation process in storage means, when a determination is given that the alternation process should be carried out;

c) determining whether or not a sector in which a write operation is carried out has its address stored in said storage means;

d) allocating the sector in which the write operation is carried out to the alternative area, when it is determined in step c) that said sector has its address stored in said storage means; and e) performing a write process in the alternative area subjected to an alternation process of step d).

6. The alternation process method as claimed in claim 5, wherein said step a) includes a step of determining whether or not data in the sector in which the read error has occurred is recoverable, and determining, when it is determined that the data is not recoverable, that the sector should be subjected to an alternation process.

7. The alternation process method as claimed in claim 6, wherein said step a) further includes a step of performing a predetermined data correction operation when it is determined that the data is recoverable, and determining that the sector in which the data is recovered should be subjected to an alternation process.

8. The alternation process method as claimed in claim 5, wherein said step a) includes a step of performing a retry operation after the read error is detected, and determining that the sector in which data is recovered by the retry operation should be subjected to an alternation process.

* * * * *